Figure 2D:
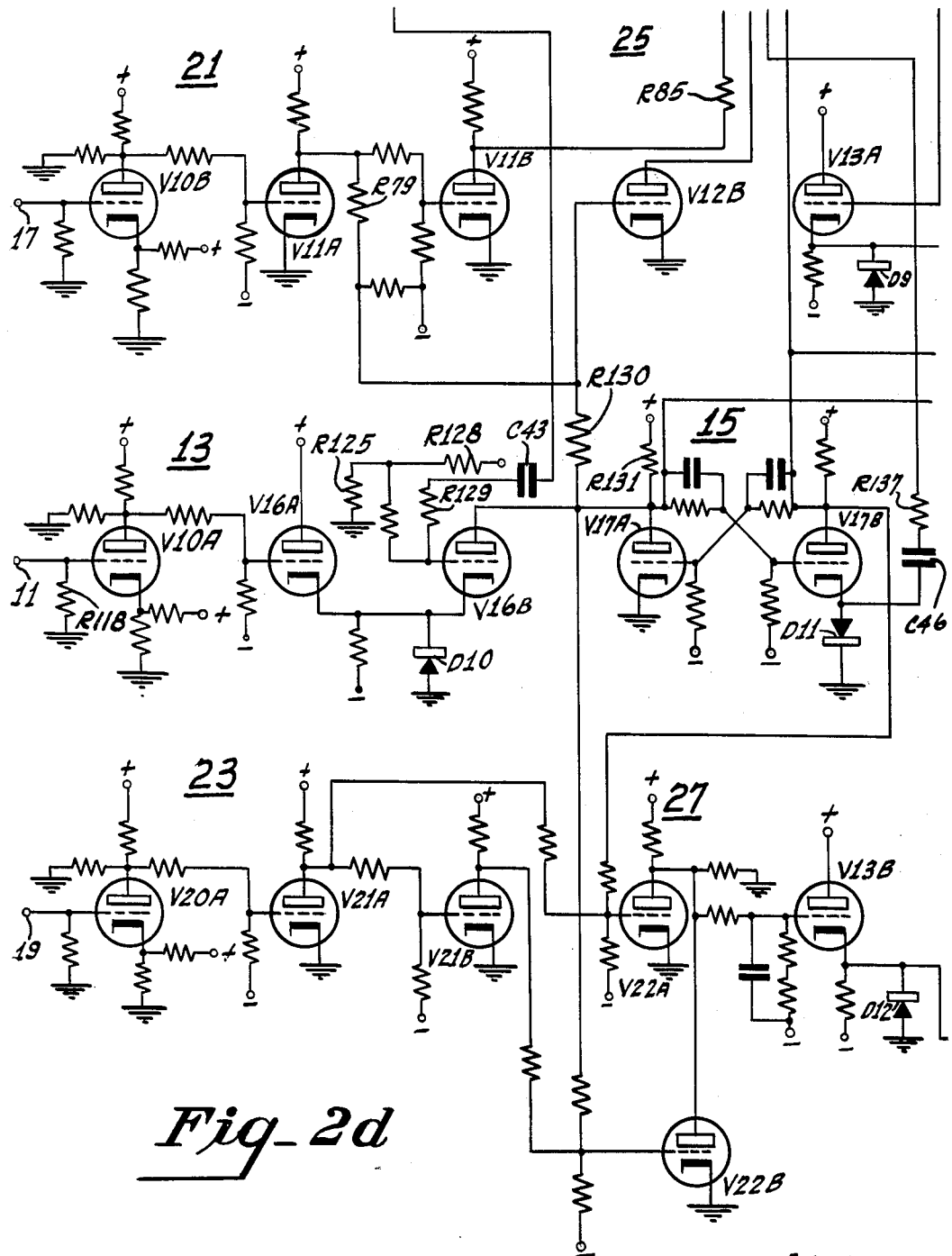

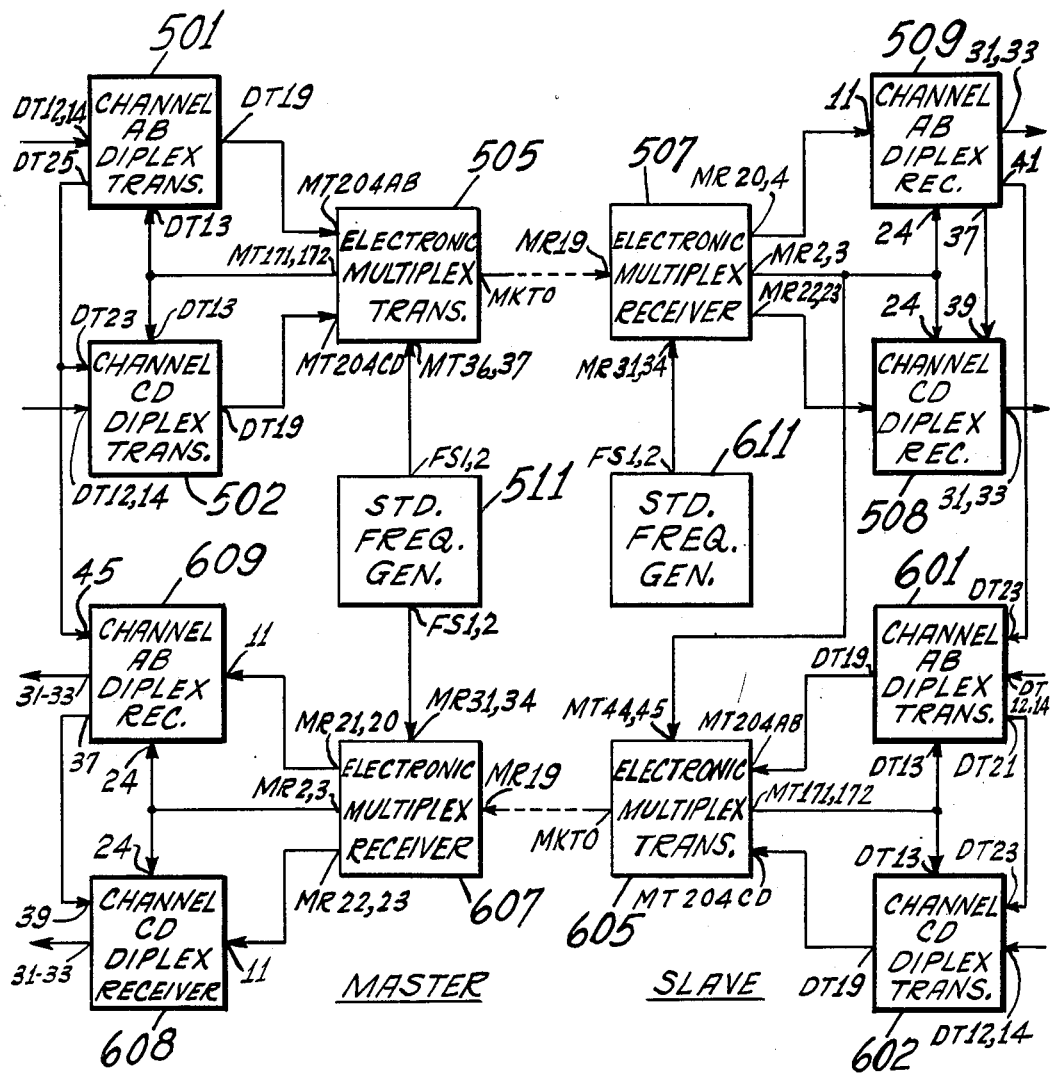

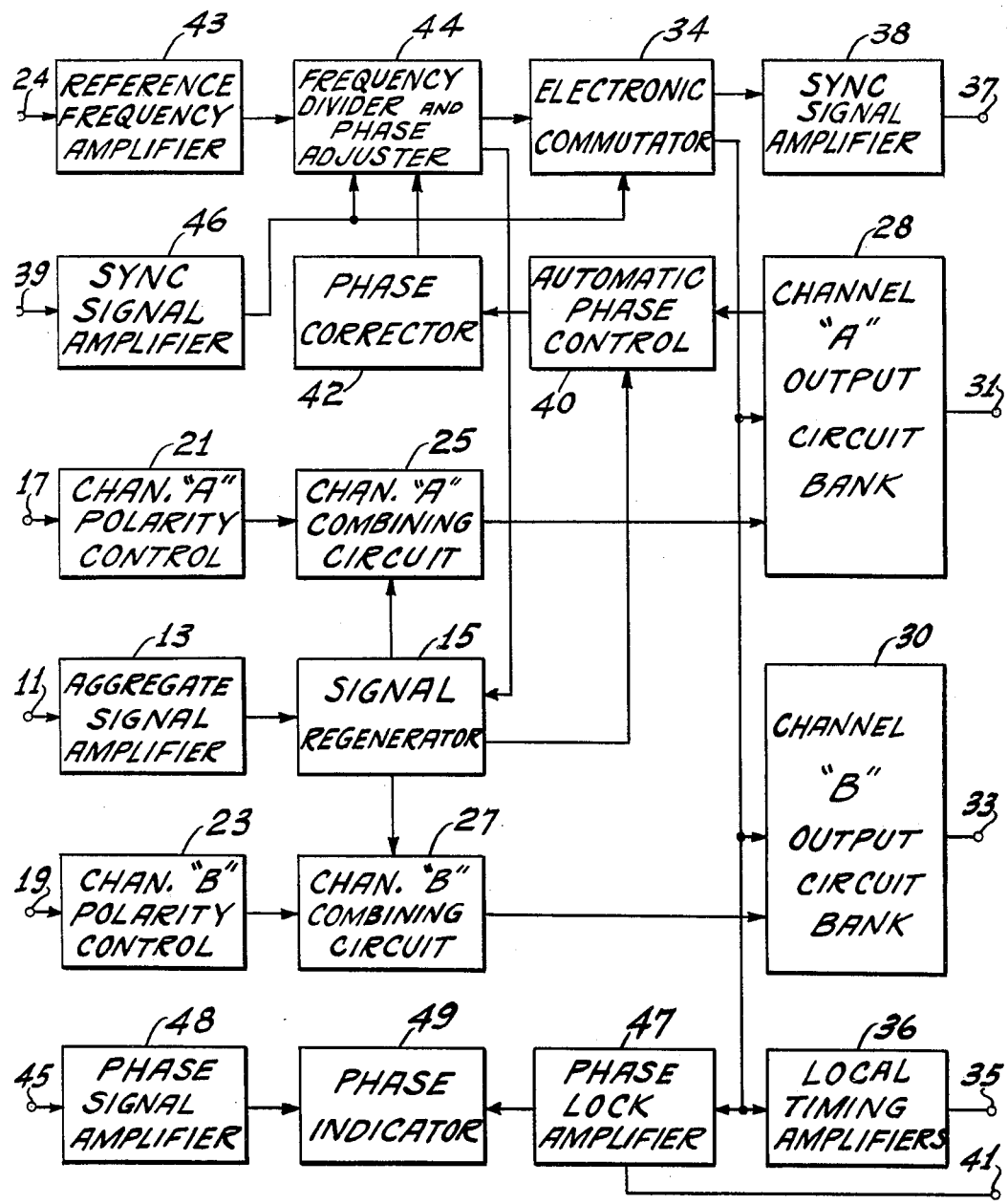
Fig_1

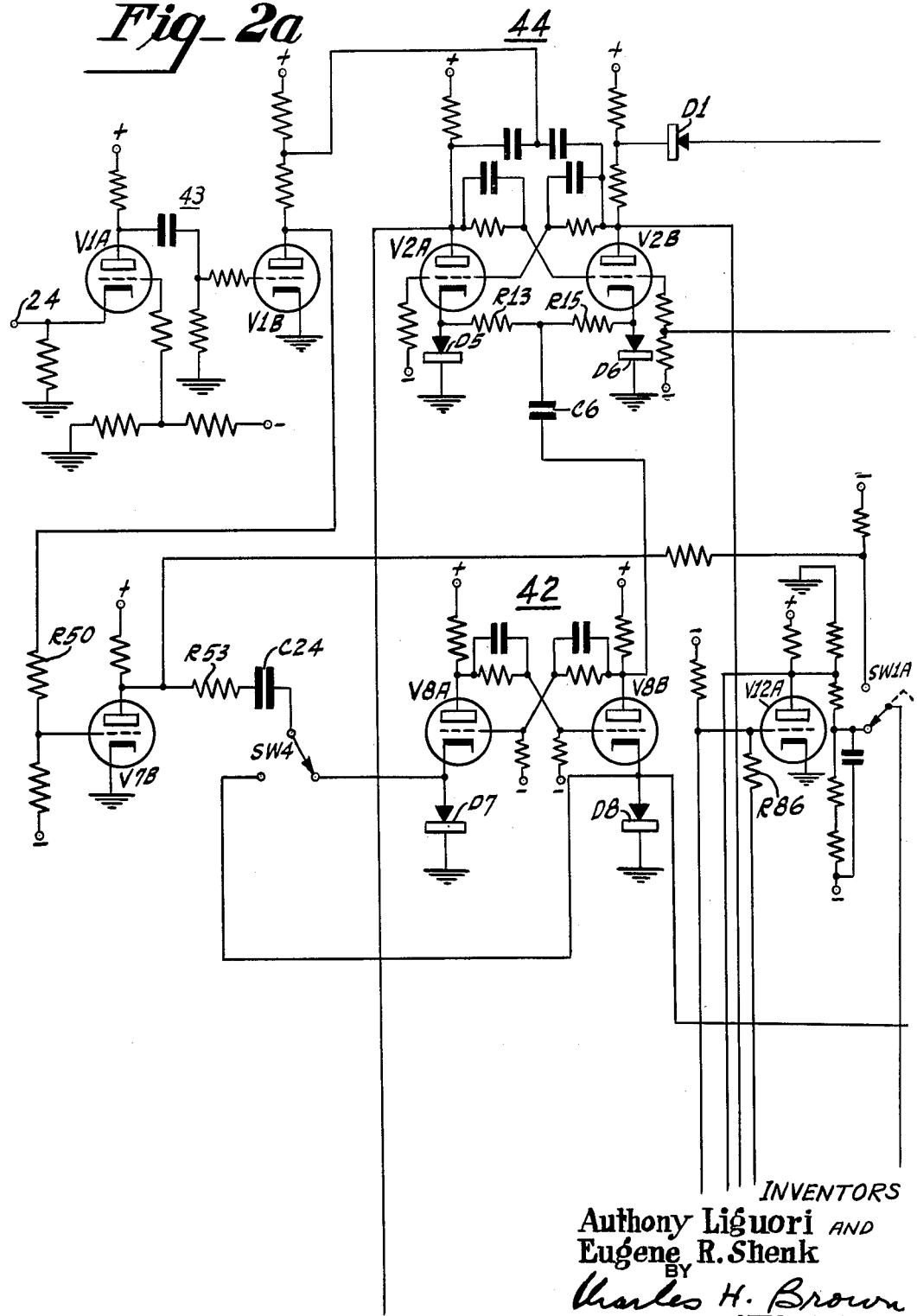

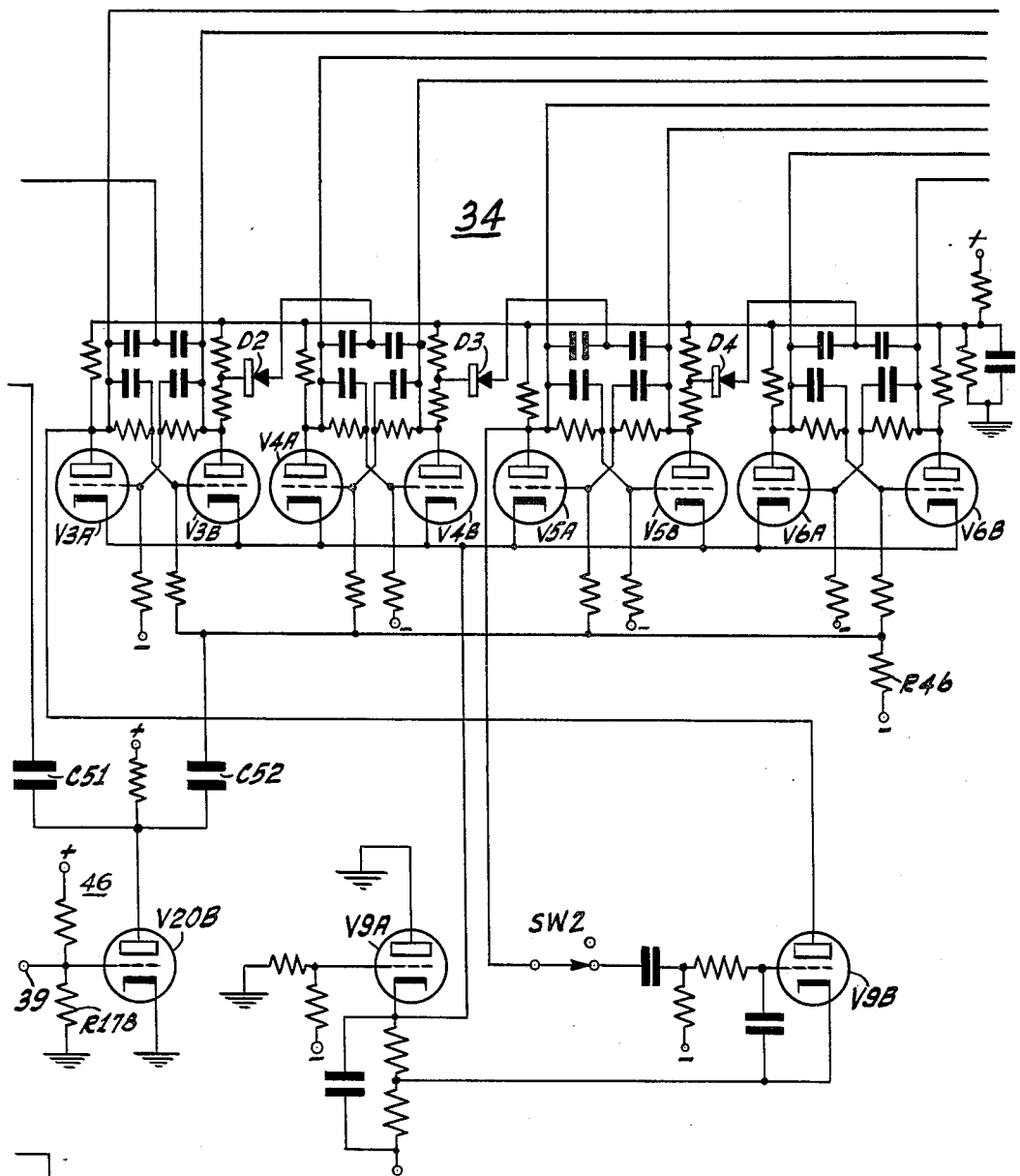

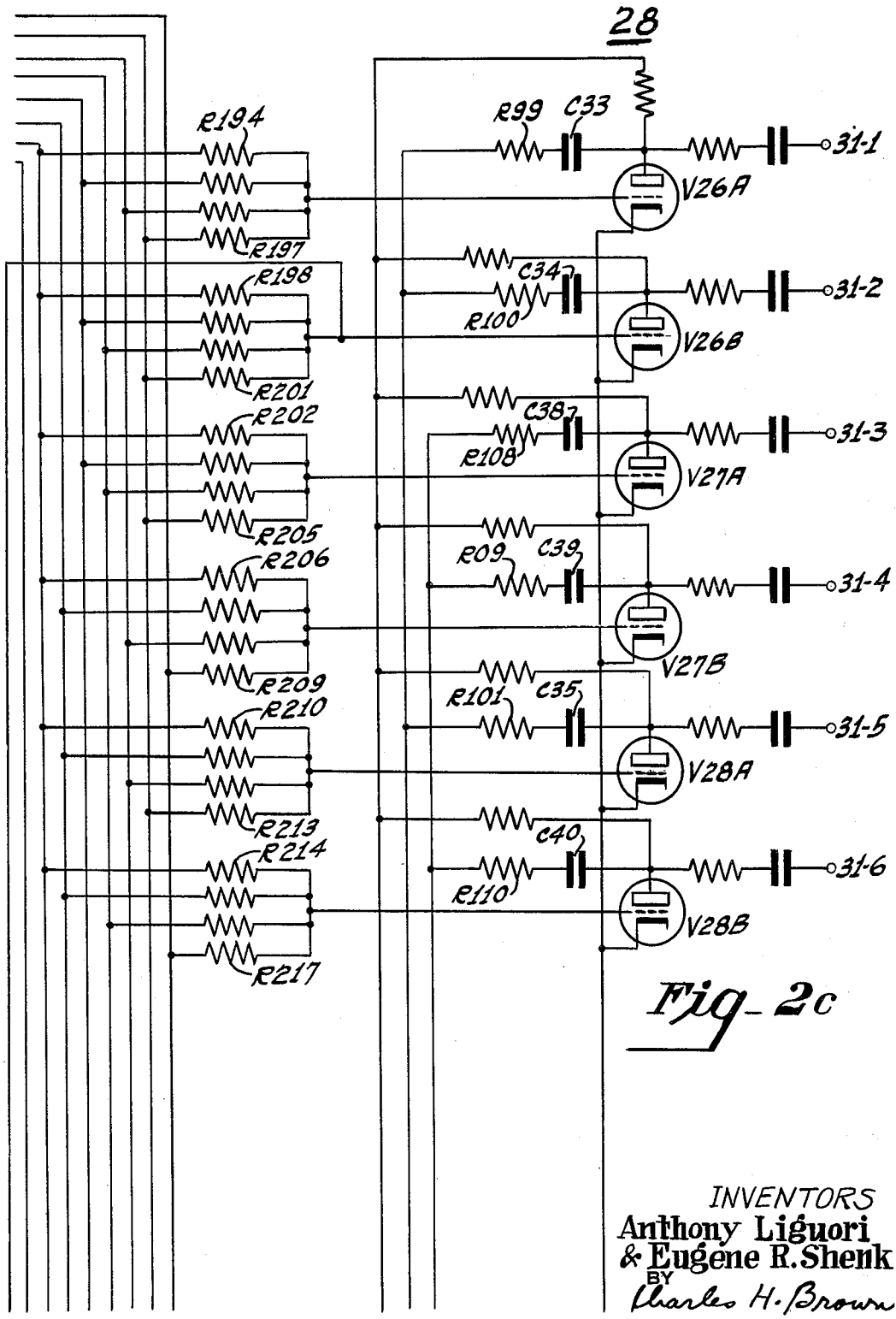
Fig_2c

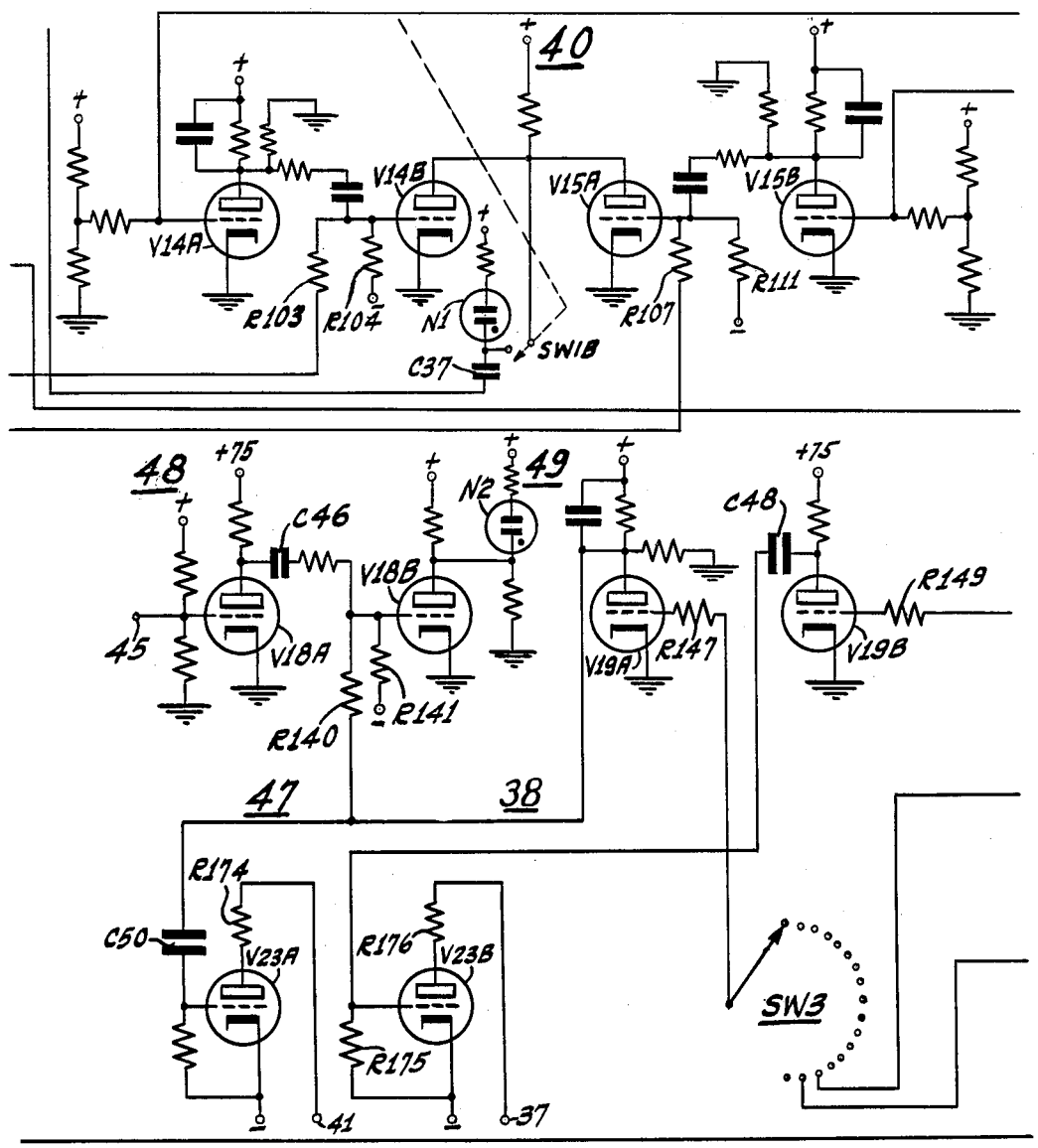
Fig_2e

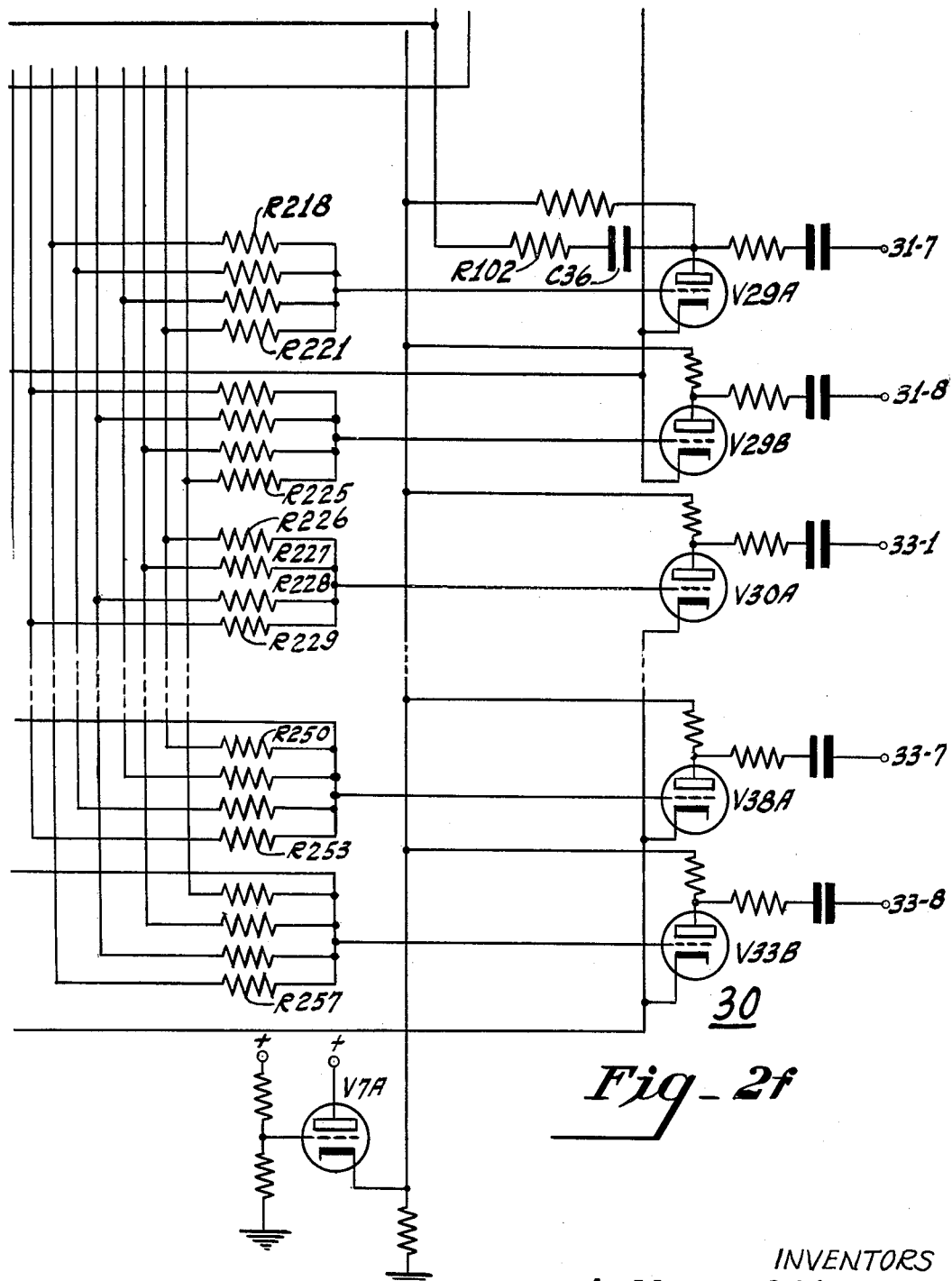

United States Patent Office 2,734,943
Patented Feb. 14, 1956

2,734,943

ELECTRONIC DIPLEX RECEIVING DISTRIBUTOR

Anthony Liguori, Hackensack, and Eugene Richard Shenk, Bergenfield, N. J., assignors to Radio Corporation of America, a corporation of Delaware Application September 30, 1952, Serial No. 312,346

18 Claims. (Cl. 178—61)

The invention relates to multiplex telegraph systems and particularly to electronic receiving multiplex distributor arrangements for such systems. More particularly, the invention is directed to an electronic circuit arrangement for diplex signal operation.

Essentially, a diplex receiver is a distributor for converting an aggregated signal in which the individual code signal elements appear serially in time in a signal path into a plurality of simultaneously or sequentially presented fixed length code signal elements on a plurality of paths.

As used hereinafter, a serial signal is construed to mean an $n$-element signal appearing element after element over a single circuit. A separate signal is construed to mean an $n$-element signal appearing over $n$ separate circuits with the elements presented simultaneously or sequentially element after element. An $n$-element simultaneous signal is construed to be one in which $n$ signal elements appear simultaneously on $n$ separate circuits, and a sequential signal is construed to be one in which $n$ elements appear on $n$ separate circuits element after element. A circuit arrangement for transposing from serial representation to a separate presentation is referred to by those skilled in the art as a ser-sep arrangement. Similarly, circuit arrangements limited to serial and simultaneous presentations are familiarly termed ser-sim arrangements, and circuit arrangements specifically limited to serial and sequential presentation are familiarly called ser-seq arrangements.

Arrangements for mechanically performing this function are known. These known diplex receiving distributors are wholly mechanical in nature; incorporating electric motors, mechanical commutators, distributors, relays and associated components of like construction. Many of the manufactured components of such mechanical systems necessarily are specially designed. Such systems inherently call for experienced personnel and involved procedures for maintenance of the commutator brushes, relay contacts, commutator segments and so forth.

A system of multiplex telegraphy now receiving attention in radio telegraph circles involves a plurality of telegraph channels transmitting in one direction between two remotely located stations and a like number of channels transmitting in the opposite direction between the same two stations. Normally, transmission between the stations takes place simultaneously in both directions and, to a great extent, independently as well. Circuitry is provided in each channel at the receiving station to check the incoming signals for possible mutilation of the individual characters. This circuitry is so arranged that upon receiving a mutilated character at one station over one channel, transmission from that one station in the opposite direction is halted in the associated channel and a signal requesting repetition of the mutilated character is transmitted over the associated channel to the other station. At this other station the receiving circuitry causes a retransmission of the character under consideration. Such systems efficaciously may use diplex distributors of the type herein described. Preferably, the improved receiving diplex distributor of the invention is used to control the functioning of the component parts of the overall system. The receiving diplex distributor may incorporate circuitry which is not essential to the diplex function in and of itself but which is necessary to the proper operation of the overall system.

It is an object of the invention to provide a highly desirable electronic receiving diplex distributor comprising only readily available, general purpose electronic components.

It is a further object of the invention to provide an improved receiving diplex distributor that is simple in operation and which does not require involved procedures for operation and maintenance.

A more specific object of the invention is to provide a novel electronic diplex receiving distributor arrangement incorporating means to reverse the polarity of the output signal corresponding to the input signals in response to a simple switching operation.

Another object of the invention is to provide an electronic circuit arrangement for automatically phasing the receiving diplex distributor with the transmitting diplex distributor merely by the manipulation of a phasing switch or similar control.

A further object of the invention is to provide an improved electronic circuit arrangement for determining, and thereafter apportioning the delay time required for a given signal to travel over the entire loop circuit formed by two telegraph channels extending between two remotely located stations and transmitting in opposite directions.

These and other objects of the invention are attained in an all electronic circuit arrangement in which the received aggregate signal is amplified and regenerated in a signal regenerator in the form of a bistable reciproconductive circuit. Polarity control information is applied to polarity control circuits to obtain the polarity of regenerated signal required thereafter in accordance with the existing polarity of the received signal. The regenerated signals are channelized and separated into the component elements and made sequentially available at separate output terminals for each element. This further separation is accomplished by gating channel A and channel B aggregate signals with coincidence voltages obtained from a timing wave generator, preferably in the form of a frequency dividing electronic commutator. The frequency dividing commutator circuits also supplies timing pulses to auxiliary equipment to control the various operations. A synchronizing signal is also obtained from the electronic commutator and made available at separate terminals.

An automatic phasing circuit is provided for use when a phasing signal is available. Otherwise, a manual phasing system is used.

For automatic phasing, a locally generated signal is obtained from one channel and compared in an automatic phasing control circuit with an incoming phasing signal as obtained from the signal regenerator. If dissimilar, a phase correcting circuit is energized to step—preferably to advance—a frequency dividing and phase adjusting circuit which is interposed between the electronic commutator and a reference frequency amplifier to which a standard frequency wave is applied. The frequency dividing and phase adjusting circuit is stepped along out of turn with the locally generated reference signal until the locally generated phasing signal matches the incoming phasing signal. A push button switch is provided for manually phasing the circuits, if desired.

Each diplex receiver unit is capable of handling two channels of communication. For four channel operation two of these units are employed. A synchronizing pulse output is supplied by the first unit and the second is automatically phased with the first unit by means of that sychronizing pulse.

For operation at a slave station, a signal is provided to lock the phase of the transmitting diplex distributor to the receiving diplex distributor at the same terminal. A switch is provided in the input circuit of the receiving diplex to control the operation of a phase lock amplifier to vary the phase difference between the two units when so operated.

For operation at a master station, this switching circuit is used in conjunction with a phase indicator circuit to indicate the relative phase between the phasing signal of the transmitting diplex distributor and the phasing signal of the receiving diplex distributor.

Figure 3:
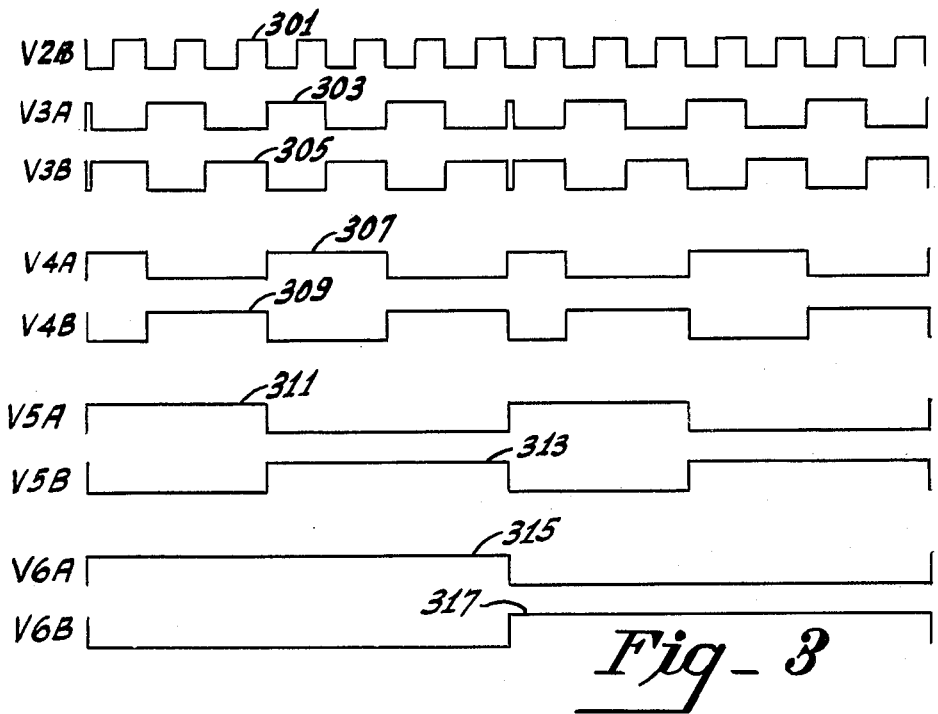
Figure 4:
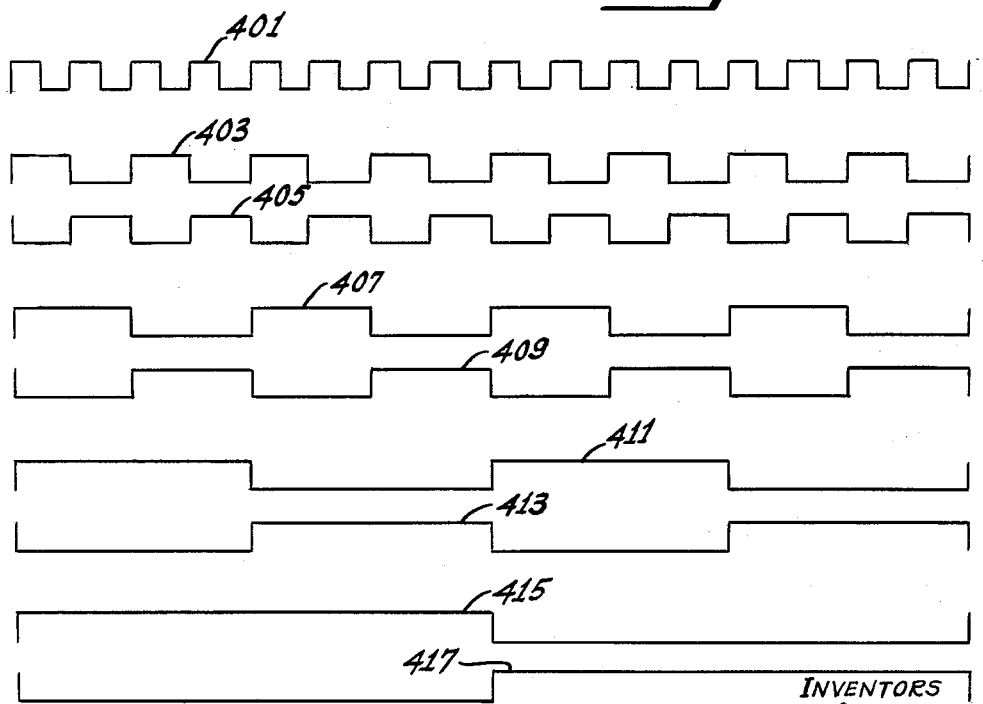

An example of apparatus according to the invention will be described in detail with reference to the accompanying drawing forming a part of the specification and in which:

Fig. 1 is a functional block diagram of a diplex receiving distributor according to the invention;

Fig. 2 (Sections 2a, 2b, 2c, 2e and 2f being taken together) is a schematic diagram of a circuit arrangement functioning according to the invention as outlined by the block diagram of Fig. 1;

Figs. 3 and 4 are graphical representations of the waveforms produced at various points of the circuit arrangement shown schematically in Fig. 2; and Fig. 5 is a block diagram showing the interconnection between the receiving diplex distributor according to the invention and an associated transmitting distributor as employed in an automatic electronic multiplex transmitting and receiving system.

Referring to Fig. 1 there is shown a functional block diagram of a diplex receiving distributor according to the invention. The received signal is applied to input terminals 11, amplified in an aggregate signal amplifier and gating circuit 13, and regenerated in a signal regenerator 15. Polarity control information which indicates the polarity of signal desired for each channel is applied to terminals 17 and 19 of the respective polarity control circuits 21 and 23. The output signal from the signal regenerator 15 and the outputs of the polarity control circuits 21, 23 are combined in combining circuits 25, 27 respectively for application to channel element output circuit 28 and 30. The signals are further separated in the channel output circuit banks 28 and 30 into the component signal elements, available at output terminals 31 and 33. Both channelizing and elementizing are accomplished by gating channel A and channel B aggregate signals with coincidence voltages obtained from the frequency dividing electronic commutator 34. Timing pulses obtained from the frequency dividing commutator circuits are made available at terminals 35 for application to the local timing output circuits. These local timing pulses are used in auxiliary equipment to control the various operations. An isolating amplifier 36 is interposed in the circuit in each case to prevent undue loading. A synchronizing signal is also obtained from the commutator 34 and made available at terminals 37. As before, an isolating amplifier 38 is preferably interposed in the output lead.

For automatic phasing, a locally generated signal is obtained from the channel A output circuit bank 28 and compared with the incoming phasing signal as obtained from the signal regenerator 15 in an automatic phasing control circuit 40. If the signals are dissimilar, a phase correcting circuit 42 is energized to step a frequency dividing and phase adjusting circuit 44, interposed between the electronic commutator 34 and reference frequency amplifier 43 to which a standard frequency wave is applied at terminal 24. The frequency dividing and phase adjusting circuit 44 is stepped along out of turn with the locally generated reference signal as applied at terminal 24 until the locally generated phasing signal matches the incoming phasing signal. A push button switch for operating the phase correcting circuit 42 is provided for manually phasing the circuits, if desired.

For four channel operation, which requires two of the units described, a synchronizing pulse output is supplied at terminals 37 by the first or channel AB unit. The second or channel CD unit is phased with the first unit by means of that synchronizing pulse applied to terminals 39 and synchronizing signal amplifier 46.

For slave station operation, a signal is provided at terminals 41 to lock the phase of the transmitting diplex to the receiving diplex. A switch is provided in the input circuit to a phase lock amplifier 47 to vary the phase difference between the two units when so operated.

At a master station the switching circuit is used in conjunction with a phase indicator circuit 49 to indicate the relative phase between phasing signal of the transmitting diplex as applied to the terminals 45 and amplified by phase signal amplifier 48 and the phasing signal of receiving diplex obtained in its own phase lock amplifier 47.

Referring to Fig. 2, there is shown a schematic diagram of one circuit arrangement, given by way of example only, by means of which the receiving diplex distributor according to the invention may be effected. The circuit arrangement shown comprises a number of high vacuum tubes, but it should be clearly understood that one skilled in the art may employ other controlled electron path devices such as gaseous electron discharge devices, transistors and the like. In actual construction, the tubes shown were of the dual type wherein two electron discharge systems or structures were contained in a single envelope.

TIMING WAVE GENERATOR

The electronic commutator 34 constituting a timing wave generator, as shown in Secs. 2a and 2b of Fig. 2, comprises a conventional frequency dividing chain of amplifiers and bistable reciproconductive circuits triggered by a synchronizing square wave, obtained from a frequency standard directly or indirectly through one of the associated components as available.

As employed herein the term "reciproconductive circuit" is construed to include all two tube regenerative devices in which conduction alternates in one or the other tube is response to applied triggering potential. The term "multivibrator" is sometimes applied to this circuit and the term "locking circuit" is sometimes applied to the bistable reciproconductive circuit, which is one in which two triggers are required to switch from one stable state to the other and return. A reference frequency amplifier 43 comprises a pair of preamplifier tubes V1A and V1B, and associated components which produce a differentiated square wave which is impressed on both grids of a frequency divider and phase adjuster 44 in the form of a binary reciproconductive circuit comprising the triode tubes V2A and V2B to provide a square wave of 85$\frac{5}{7}$ cycles per second. This wave is applied to the succeeding dividers by way of a coupling diode element D1. Eight tubes V3A–V6B are connected in a known ring circuit to divide this frequency by a factor of fourteen when a division factor switch SW2 is in one position and by a factor of sixteen when the switch is in the other position. The ring circuit shown is essentially a conventional Eccles-Jordan circuit with the tube V9B as the reset path for division by a factor of fourteen and the tube V9A as a voltage regulator device to provide the proper cathode voltage for these frequency dividers. The grid of one tube of each of the last four reciproconductive circuits returns to −150 through a common resistor R46, for the purpose of locking the electronic commutator 34 in a preassigned phase relationship with another identical unit for four channel operation, as will be explained later.

The curves 301–317 in Fig. 3 show the various wave forms at pertinent points of the divider chain for the seven unit operation and the curves 401–417 in Fig. 4 show the wave forms which differ for the eight unit operation. An aggregate signal from a receiver such as an electronic multiplex receiver, described in copending U. S. patent application Ser. No. 227,344 filed May 21, 1951, now Patent No. 2,716,158, or the equivalent source, is applied at the signal input terminals 11 and impressed across a resistor R118 in the grid circuit of the tube V10A of the aggregate signal amplifier and gating circuit 13. For the purpose of explanation, the operation of the diplex distributor according to the invention and the multiplex receiver and transmitter associated therewith are assumed to be set for 4-channel operation, that is two diplexes are used at such terminal operating at 42⅔ bauds, or signal elements, per second. The term baud is employed herein to conform to the definition given in the A. I. E. E. "American Standard Definitions of Electrical Terms," published in 1941. Where the older definition would apply, the terms signal element or baud element are used with the latter shortened to "baudel" for convenience.

For four channels of seven unit code operation, two transmitting and two receiving diplexers are used, one each for the A and B channels and one each for the C and D channels. The four channels are presented to the electronic multiplex transmitter in pairs, that is, A and B over one lead and C and D over another lead. The electronic multiplex transmitter in turn combines the signals from the two leads into an aggregate signal over one lead, preferably in the aggregation:

$A_1C_1A_2C_2A_3C_3A_4C_4A_5C_5A_6C_6A_7C_7$
$B_1D_1B_2D_2B_3D_3B_4D_4B_5D_5B_6D_6B_7D_7$

This aggregation is termed a sequentially interleaved aggregation. It is construed as sequential because each diplex signal in itself consists of elements $A_1$ through $A_7$ followed by elements $B_1$ through $B_7$ for one diplex transmitter and elements $C_1$ through $C_7$ followed by elements $D_1$ through $D_7$ for the other diplex transmitter. It is stated to be interleaved because each channel of a diplex transmitter presents the signal elements thereof alternately with a channel from the other diplex transmitter. The receiving diplex distributor channelizes this aggregated signal and also provides the means for insuring that respective channel signal elements in the total aggregation are distributed to the proper bank of input tubes. Each aggregate baudel is 5.83 milliseconds long. The aggregate signal is amplified in a signal input amplifier tube V10A and applied to the grid of a cathode follower V16A. The grid of the tube V16A is made to swing both positive and negative with respect to a point of fixed reference potential which in this case is ground. The cathode of the tube V16A is arranged to follow the grid on positive excursions of grid voltage, but on negative excursions the cathode is arranged to go to ground and a clamping diode D10 is made to clamp the cathode to ground so that it cannot go negative. The cathode of the tube V16A is tied to the cathode of the following tube V16B which is arranged to control the application of pulses to the regenerator 15 in response to the applied aggregate signal. Positive pulses at an 85⅓ C. P. S. rate are applied to the grid of the aggregate signal gating or control tube V16B. The amplitude of these pulses is such that when the tube V16B cathode is positive, the pulses cannot cause the tube V16B to conduct, but when the cathode of the tube V16B is at ground potential, the positive pulses are of sufficient amplitude to overcome the bias supplied by a voltage divider comprising resistors R125 and R128 and the aggregate signal gating tube V16B then conducts through a resistor R131. It can thus be seen that when the input signal applied to the input amplifier tube V10A is positive, a pulse of current is passed through the resistor R131. When the input signal is zero, the tube V10A is cut off and no pulse passes through the resistor R131. The resistor R131 is part of a signal element regenerator circuit 15 comprising a pair of tubes V17A, V17B and associated components arranged in a bistable reciproconductive circuit. When the tube V16B conducts the signal regenerator circuit 15 is tripped to the marking condition. A train of negative pulses tending to trip the regenerator circuit to the spacing condition is applied to the cathode of the tube V17B. These pulses are obtained from the electronic commutator 34 serving as a local timing wave generator and hence the negative pulses coincide in time with the positive pulses applied to the grid of the tube V16B. The pulses to the grid of the tube V16B endure longer because of the difference in time constant of the resistance capacity differentiating network comprising the resistor R129, the capacitor C43 and the resistor 137 and the capacitor C46. The differentiating network also comprises a diode D11 which shunts to a ground or neutral connection the positive pulses produced by the differentiation of the pulses obtained from the electronic commutator 34 and fed to the cathode of the tube V17B. In the presence of both pulses, the pulse through the tube V16B is controlling and the signal regenerator circuit 15 is tripped to, or held to the marking condition. In the absence of pulses through the signal gating tube V16B, the negative pulses to the cathode of the tube V17B trip the regenerator circuit 15 to the reciprocal or spacing condition.

The first step in channelizing the incoming aggregate signal is performed in the signal element regenerator 15 by applying the pulses to the tubes V16B and V17B at intervals of 11.66 milliseconds. Since the incoming signal elements or baudels are 5.83 milliseconds long, every other baudel of the incoming signal is regenerated to twice the initial length while the inbetween baudels are ignored. Since the incoming aggregate signal from the multiplex receiver was assumed to be composed of 2 diplex signals, the regenerated signal is that of 1 diplex only. This signal appears in opposite phase at complementary outputs; that is, on the two anodes of the tubes V17A and V17B of the regenerator circuit 15.

OUTPUT SIGNAL GENERATION

It is conventional in multiplex telegraph signalling systems based on bi-stable signalling currents to invert the elements on alternate channels; for example, to make the marking polarity of one channel the spacing polarity of another channel. If it is desired to depart from the assigned marking and spacing polarities of one or both channels in the system according to the invention, information to do so is presented to the proper polarity control input terminals 17 or 19 of the polarity control circuits 21 or 23 and the combining circuits 25 or 27 may be caused to ignore the pre-assigned convention and deliver the signal polarity called for by the polarity control information as will be more completely described hereinafter.

In the absence of any polarity control information, that is, with the terminal 17 open circuited, the polarity control tube V10B is arranged to be cut off. The tube V11A is arranged to conduct when the anode of the tube V10B is positive. The following tube V11B is arranged to be cut off when the anode of the tube V11A is comparatively negative. The anode of the tube V11B is then positive. For marking input, that is, +20 volts, on the grid of the input amplifier tube V10A, the tube V17A is arranged to conduct, and the anode is comparatively negative; the tube V17B is cut off and the anode is arranged to be positive. Therefore, for direct or non-inverted operation the positive voltage of the regenerator tube V17B is combined with the positive voltage of the tube V11B through a pair of resistors R85, R86 and applied to the grid of a combining tube V12A. Both signals and polarity control voltages have to be positive to cause the combining tube V12A to conduct. When the tube V17B anode drops to a comparatively negative value, the tube V12A is cut off. The tube V12A is thus following the input signal, that is, the tube V12A conducts when input is +20 volts and is cut off when input is zero. Since the anode of the tube V11A is comparatively negative, the tube V12B cannot conduct, no matter what the polarity of the signal may be.

When the combining tube V12A is conducting the anode drops to a relatively negative value, and the grid of a cathode follower tube V13A also drops to a very negative value. The cathode of the tube V13A can follow the positive excursions of the grid, but a diode D9 limits the negative excursions to zero. The cathode of the tube V13A is arranged to pull the cathodes of a bank 28 of signal element output tubes V26A, V26B, V27A, V27B, V28A, V28B, V29A and V29B along with it. The voltage on the cathodes of all the channel A output tubes is, therefore, varying with the input signal. On marking input to the input amplifier tube V10A, that is +20 volts, the cathodes of the output tubes are at ground or zero potential. On spacing input, that is, zero input voltage to the tube V10A, the cathodes of the output tubes are at a very positive potential.

ELECTRONIC COMMUTATION

The anodes of the tubes V3A—V6B are combined through isolating resistors R194—R257 to form sixteen coincidence points in such permutations that the voltage at any one of these coincidence points is above ground potential for a given length of time only and is below a specified negative potential for the rest of the commutation period. This positive potential appears at each of the sixteen coincidence points in turn and constitutes the gating potential. Each of the sixteen points is tied to the grid of a signal element output gating triode in the two banks of gating tubes V26A—V33B. This signal is slightly positive with respect to ground for one channel baudel, that is, 11.66 milliseconds and negative for the other thirteen channel baudels. The first time element of the coincidence signal applied to tube V26A grid is positive and elements 2 to 14 are negative. Tube V26B has the second element positive and elements 1 and 3 to 14 are negative, and so on in order down the line.

When the grid of the first signal element output gating tube V26A is positive with respect to ground, if its cathode is at ground potential, the tube V26A will conduct and generate an output pulse. If the cathode of tube V26A is very positive when its grid is positive, then the output tube V26A will not conduct and no pulse is generated. The generation of an output pulse depends on the polarity of the incoming signal and the coincidence signal. If storage of the output signal elements is desired a bistable reciproconductive circuit or other storage device can be connected to each of the output terminals 31–1 to 31–8 and 33–1 to 33–8.

Channel B operates in much the same manner as channel A, except that the pulse train in channel B is normally inverted. It, therefore, uses the voltage from the anode of the tube V17A for combining with the polarity control information. In the absence of polarity control information to the tube V20A, that is, if the terminal 19 is open circuited the tube V20A is arranged to be cut off and the combining tube V21A to conduct, and consequently the tube V21B is cut off. The anode of the tube V21B is, therefore, positive. This positive voltage is combined with the signal variations on the plate of the regenerator tube V17A and the combining tube V22B is caused to turn on or off. When the aggregate signal is spacing, the anode of the regenerator tube V17A is positive, the tube V22B is conducting and the grid of the tube V13B is highly negative. The cathode of the regenerated signal repeating tube V13B and the cathodes of the signal element output gating tubes V30A, V30B, V31A, V31B, V32A, V32B, V33A and V33B are at ground potential. In the presence of a positive coincidence signal on the grid of any one of these output tubes, that tube will conduct.

It can be seen that in the absence of any polarity control information, channel A output tubes will conduct only on marking input and channel B output tubes will conduct only on spacing input.

The output pulses are coupled through the associated resistors and capacitors to the utilization equipment at terminals 31–1 to 31–8 and 32–1 to 32–8.

OUTPUT SIGNAL POLARITY SELECTION

Direct or inverted output signal elements are selectively obtained through the combining circuits. The channel A combining circuit comprising a polarity control tube V10B, two switching tubes, V11A, V11B, and two combining tubes V12A, V12B, will be described in detail; it being understood that the corresponding circuitry for channel B operates in essentially the same manner. As previously explained, when there is no polarity control signal applied to the polarity control tube V10B grid, the combining tube V12A will conduct when the aggregate signal applied to the polarity control tube V10A is +20 volts, and the combining tube V12A is cut off when the signal is zero.

In the presence of polarity control signal on the grid of tube V10B, that is, +20 volts, then the tube V10B will conduct, one switching tube V11A is cut off and the other switching tube V11B will conduct. Since the grid of the switching tube V12A is connected to the anode of the other switching tube V11B through a resistor R85, as long as the tube V11B is conducting, the tube V12A can never conduct. Since the grid of the tube V12B is connected to the anode of the tube V11A through a resistor R79, and since the one switching tube V11A is non-conducting, the tube V12B can conduct when the tube V17A is positive and will be blocked when the tube V17A conducts. The anode of the tube V17A is positive for zero aggregate signal input to the grid of the input tube V10A, and negative for a +20 volt signal on the grid of the tube V10A. The combining tube V12B conducts for zero aggregate signal input and is non-conducting for a +20 volt input signal. Since the anodes of the combining tubes V12A and V12B are tied together, the signal applied to the grid of the cathode follower V13A is now just the reverse of what it had been in the absence of polarity control signal.

A square wave of 171 3/7 C. P. S. obtained from the multiplex receiver is applied at the terminals 24 to the cathode of the tube V1A. The wave is amplified and clipped in tubes V1A and V1B and differentiated to drive a bistable reciproconductive circuit 44 comprising the triodes V2A and V2B at 85 5/7 C. P. S. to drive the electronic commutator 34 in turn. The output frequency of the reciproconductive circuit comprising the tubes V6A and V6B is 6 9/49 C. P. S. The anodes of the tubes V3A—V6B are returned to a slightly positive voltage so that when any of the tubes is cut off, the anode of the tube is at approximately +7 volts. The anodes of these tubes are connected through resistors to the grids of the output tubes in such a fashion that each grid is positive for 11.66 milliseconds in consecutive order. Figure 3 is a timing chart for 7 unit operation and Fig. 4 is a timing chart for 8 unit operation.

AUTOMATIC PHASING

The automatic phasing section comprises four triode tubes V14A, V14B, V15A, V15B and associated components. Both phases of the regenerated signal as obtained from the regenerator tubes V17A and V17B, a locally generated signal from the channel A output section comprising the output signal gating tubes V26A, V26B, V27A, V27B, V28A, V28B and V29A and the bistable reciproconductive phase correcting circuit comprising the tubes V8A, V8B are utilized in this section.

As previously explained, when the input signal is marking, one regenerator tube V17A conducts and the anode thereof is low, and the anode of the other regenerator tube V17B is high, that is, at +B. The anode of the regenerator tube V17A is connected through a resistor R107 to the grid of a comparator tube V15A in the phasing signal comprising circuit 40 and the anode of the tube V17B is connected through a coupling resistor R103 to the grid of the other comparator tube V14B. The values of the coupling resistor R103 and the grid resistor R104 are such that on marking input, the tube V14B grid is just slightly below cutoff. On spacing input the grid of the tube V14B is very far below cutoff. The values of the coupling resistor R107 and the grid resistor R111 are such that on marking input the grid of the tube V15A is very far below cutoff and on spacing input, the grid of the tube V15A is just slightly below cutoff. For automatic phasing, the diplex transmitter described in copending U. S. patent application Serial Number 279,432 of A. E. Canfora and A. Liguori filed March 29, 1952, now Patent No. 2,682,574, issued June 29, 1954, sends out a phasing signal. This phasing signal is carried on channel A only, and preferably consists of the letter A in the 7 unit protected code; elements 3, 4, 6 and marking the elements 1, 2, 5, and 7 spacing. Channel A, of course, normally carries the characters of message signals. The transmission of the message signals on channel A is discontinued for certain time intervals by the operation of the diplex transmitter and, during such intervals, the diplex transmitter operates to repetitiously send the phasing signal on channel A. Channels B, C, and D may have any characters in the process of transmission except that the character used in phasing must no occur repetitiously on channels B, C or D.

Positive pulses coinciding in time with the locally generated elements 1, 2, 5 and 7 are also applied to the grid of the comparator tube V14B. If the receiver is correctly phased, the grid of the tube V14B is very far below cutoff for elements, 1, 2, 5, and 7, and the positive pulses cannot cause the tube V14B to conduct. If the receiver is not correctly phased, the grid of the tube V14B will not always be very far below cutoff when the positive pulses are applied. The tube V14B will then conduct and a negative pulse will be coupled through a capacitor C37 to the cathode of the phase corrector tube V8B across the diode D8 and cause the tube V8B to conduct. When the tube V8B conducts, a negative pulse from the anode is coupled through a capacitor C6, and a pair of cathode connecting resistors R13 and R15 to the cathodes of the phase adjuster tubes V2A and V2B. Whichever tube is blocked will then conduct and the tube which was conducting will be cut off. This added pulse has the same effect as a pulse from the reference pulse tube V1B. Since the pulses from the tube V1B are 5.83 milliseconds apart, the added pulse has speeded up the locally generated element by 5.83 milliseconds; that is, the element existing at the time of the added pulse is shortened from 11.66 milliseconds to 5.83 milliseconds. In this manner, the locally generated phasing elements are moved up in time until they coincide exactly with the incoming phasing signal elements.

Positive pulses coinciding in time to the locally generated elements 3, 4 and 6 are also applied to the grid of the tube V15A. If the receiver is correctly phased the grid of the comparator tube V15A is very far below cutoff for elements 3, 4 and 6 and the positive pulses cannot cause the tube V15A to conduct. If the receiver is not correctly phased, the grid of the tube V15A will not always be very far below cutoff when the positive pulses are applied. The tube V15A will conduct and the reciproconductive circuit 44 comprising the tubes V2A, V2B will be stepped along by 5.83 milliseconds the same as when the tube V14B conducted, since the anodes of both of these tubes are tied together.

Automatic phasing can only take place when the phasing switch SW1 is in the "autophasing" position. The second section of this switch SW1B allows the pulse from the anodes of the tubes V14B and V15A to be coupled through a capacitor C37. Every time either of the tubes V14B or V15A conducts, a pulse of current is also passed through a neon glow lamp N1 and the lamp will glow. When the receiver is in phase, no pulses are passed through the tubes V14B or V15A, therefore the lamp N1 will not glow, signifying "in phase." Therefore, for automatic phasing SW1 is held in the "autophasing" position until the lamp N1 stops glowing, then the switch is permitted to return to the "traffic" position as shown in the drawing.

The other section of the phasing switch SW1A is associated with the grid of the cathode follower V13B and is instrumental in generating the positive pulses which are applied to the grids of tubes V14B and V15A. When SW1A is in the traffic position the regenerated signals from the anodes of the switching tubes V12A, V12B are applied to the grid of tube V13A, which is used as a cathode follower, to the common cathodes of all the signal element-gating tubes in the channel "A" output bank 28. As previously explained, the tubes in the output section are readied in order; that is, the grids are made slightly positive, one at a time. Each grid is positive for 11.66 milliseconds. If the cathodes are positive, selected tubes only can conduct. The switch SW1A is connected to a square wave source of frequency 171 3/7 C. P. S. The phase is such that when any tube is selected its cathode is positive 5.83/2 milliseconds then at ground for 5.83/2 milliseconds, then positive for another 5.83/2 milliseconds and finally at ground for another 5.83/2 milliseconds. Thus, every tube that is selected can conduct twice during its selected period. Each time it can conduct for 5.83/2 milliseconds. The anodes of the tubes corresponding to the output elements 1, 2, 5 and 7, that is, the tubes V26A, V26B, V28A, and V29A are connected through resistors R99 to R102 and capacitors C33 to C36 to the grid of the tube V14A. Each time any of the above tubes conducts, a negative pulse is applied to the grid of the tube V14A. It shows up as a positive pulse at the anode of the tube V14A and is applied to the grid of the tube V14B where it is combined with the regenerated signal, as previously explained.

The anodes of the tubes corresponding to the elements 3, 4 and 6, that is, the tubes V27A, V27B and V28B are connected through resistors R108 to R110 and capacitors C38 to C40 to the grid of the tube V15B. Each time any of the above tubes conducts, a negative pulse is applied to the grid of the tube V15B. It shows up as a positive pulse at the anode of the tube V15B and is applied to the grid of the tube V15A where it is combined with the regenerated signal, as previously explained.

MANUAL PHASING

The automatic phasing system requires a phasing signal to be transmitted by the diplex transmitter. This can easily be accomplished on startup but not while on traffic. If a slippage occurs the operator at the receiving station may not always be able to contact the operator at the transmitting station to ask for a phasing signal. A manual phasing section is incorporated in the circuit to eliminate the need of getting in touch with the transmitting station. The manual phasing section consists of tubes V7B, V8A, V8B and associated components. It utilizes the 171 3/7 C. P. S. from tube V1B and it advances the 85 5/7 binary whenever SW4 is pushed.

Under normal conditions the 171 3/7 C. P. S. wave from the anode of the amplifier tube V1B is coupled through a resistor R50 to the grid of the tube V7B, causing the tube V7B to alternately conduct and be cut off. When tube V7B conducts, a negative pulse is coupled through a resistor R53 and a capacitor C24 to the cathode of the tube V8A. This stream of negative pulses keeps the tube V8A conducting continuously. When the switch SW4 is pushed, the stream of pulses is applied to the cathode of the tube V8B. The very first negative pulse causes the tube V8B to conduct and the tube V8A to be cut off. This condition holds for as long as the switch SW4 is held down. As soon as the tube V8B starts to conduct a negative pulse is coupled through a capacitor C6 and resistors R13 and R15 to the cathodes of both of the phase adjuster tubes V2A and V2B. In the cathode leads there are germanium diodes, D5 and D6, which can be any other known form of diode if desired. The diodes D5 and D6 have very low impedances when current is flowing through them and very high impedances when there is no current flow.

The negative pulse coupled through the coupling capacitor C6 will be of very low amplitude on one cathode and high amplitude on the cathode which is not passing current. The pulse drives the cathode below the grid bias and that particular tube starts to conduct and the other one is cut off. This has the effect of adding one pulse to the chain of pulses driving the phase adjuster tubes V2A, V2B from the anode of the tubeV1B. Since the pulses from the tube V1B are 5.83 milliseconds apart, the electronic commutator 34 is advanced by 5.83 milliseconds.

When the tube V1B conducts, negative pulses are applied to drive the tubes V2A and V2B. When the tube V1B is cut off, the anode goes positive and the tube V7B conducts and generates negative pulses to drive the phase corrector tubes V8A, V8B. It can thus be seen that the tubes V2A and V2B are at rest when the tubes V8A and V8B are being driven. This insures that the negative pulses from the tube V8B to the tubes V2A and V2B will never coincide in time with the negative pulses from the tube V1B to the tubes V2A and V2B.

Each push of the manual phasing switch SW4 will advance the phase adjuster 44 one step, that is, 5.83 milliseconds; no matter how long or how short a time the switch SW4 is held down.

Since there are 14 elements in each unit, a maximum of 27 pushes on the switch SW4 will bring the unit into correct phase under the worst possible conditions.

FOUR CHANNEL OPERATION

For four channel operation it is necessary to have two of the diplex receivers operating together. The first receiver is usually called the AB receiver and the second is usually called the CD receiver. It is desired to have a fixed relationship between the two receivers so that the element $A_1$ starts out 5.83 milliseconds before the element C1, the element $A_1$ being the first element of the A chanel and C1 the first element of the C channel. To accomplish this, a phasing signal is generated in the electronic commutator of the AB receiver and applied to the CD receiver where it locks the electronic commutator of the latter to the correct phase relationship.

In the AB receiver the tubes V19B, V23B and associated components generate the phase lock signal. The grid of the tube V19B is connected through a resistor R149 to the grid of the tube V26B. A coincidence signal from the electronic commutator is applied to the grid of the tube V26B. The grid of the tube V26B is positive for one element and negative for the other 13 elements. Since the grid of the tube V19B receives the same signal, the tube V19B conducts for one element and is blocked for 13 elements. The signals from the anode of the tube V19B are coupled through a capacitor C48 to the grid of the tube V23B. The grid of the tube V23B is connected through a resistor R175 to the cathode. Therefore the tube V23B is always conducting, except when a negative pulse is applied from the tube V19B, that is, when the tube V19B is conducting.

When the tube V23B in the AB receiver conducts, current passes through the resistor R176 in the AB receiver and then to the resistor R178 in the grid circuit of the tube V20B in the CD receiver. Preferably, the channel AB unit and the channel CD unit are identical in every respect, so that either can be connected as either an AB or a CD receiver. The AB receiver leads and the CD receiver follows.

As long as current is flowing through the tube V23B and resistors R176 and R178 the tube V20B will remain cut off. As soon as the current stops flowing, the tube V20B conducts and negative pulses are coupled through the capacitors C51 and C52. The pulse through capacitor C51 insures that the tube V2B is cut off at that particular instant. The pulse through the capacitor C52 is generated across the resistor R46 in the grid return circuits of the tubes V3B, V4A, V5A, and V6B. The negative pulse insures that all the tubes connected to the resistor R46 are cut off at the arrival of the pulse. The arrival of the pulse coincides with the beginning of the $A_2$ pulse and it resets the reciproconductive circuits of the electronic commutator in the CD diplex so that it is in the second half of the $C_1$ element. The grid of the tube V30A is connected to the anodes of the tubes V3B, V4A, V5A and V6B through the resistors R226, R227, R228 and R229. When these four tubes are blocked, the grid of the tube V30A is positive and corresponds to its selection. When the tube V2B conducts, the electric commutator is advanced by one element. When the tube V2B is blocked, that signifies the middle of the selected element. As long as the pulse is being applied to the tube V20B, the CD receiver will follow the timing of the AB receiver. When the AB channel receiver is correctly phased, the CD channel receiver is automatically in phase.

LOOP CIRCUIT DELAY DETERMINATION

These units are designed primarily for use with the Automatic Request and Repetition system briefly outlined in the beginning. This system necessitates in any loop, a master station and a slave station.

The place of the diplex receiver according to the invention in the overall scheme of automatic request and repetition systems is shown in the block diagram of Fig. 5. Four channels of communication are afforded in one direction by the system comprising two transmitting diplex distributors 501, 502 feeding into an electronic multiplex transmitter 505 which is connected by radio or wire link to an electronic multiplex receiver 507 in turn feeding two receiving diplex distributors 508 and 509. Four channels of communication are afforded in the other direction by a similar arrangement comprising transmitting diplex distributors 601, 602; electronic multiplex transmitter 605; electronic multiplex receiver 607; and receiving diplex distributors 608 and 609. At the master station, the electronic multiplex transmitter 505 and the electronic multiplex receiver 607 are supplied with a standard reference frequency wave obtained from a standard frequency generator 511. Only the electronic multiplex receiver 507 is supplied with a reference wave from identical standard frequency generator 611; operation of the electronic multiplex transmitter 605 being locked in phase with the receiver 507.

The transmitting diplex distributors, electronic multiplex transmitters, electronic multiplex receivers, and the standard frequency generators are described in detail in copending U. S. patent applications: Serial Number 211,272 of E. R. Shenk, A. Liguori and A. E. Canfora filed February 16, 1951, now Patent No. 2,671,132, issued March 2, 1954; Serial Number 227,344 of E. R. Shenk, A. E. Canfora and P. E. Volz filed May 21, 1951, now Patent No. 2,716,158, issued August 23, 1955; Serial Number 279,432 of A. E. Canfora and A. Liguori filed March 29, 1952, now Patent No. 2,682,574, issued June 29, 1954; and Serial Number 227,305 of P. E. Volz filed May 21, 1951, now Patent No. 2,706,785, issued April 19, 1955, respectively.

In the diagram of Fig. 5 reference characters are assigned to the connecting leads with a view toward ready identification of the terminals of each piece of apparatus as described in the pertinent patent application. Reference characters consisting only of numerals are used to refer to the terminals of the diplex receiver according to the invention as shown in Figs. 1 and 2. The reference characters referring to the remaining components consist of letter prefixes DT, MT, MR and FS, corresponding to the Diplex Transmitting Distributor, the electronic Multiplex Transmitter, the electronic Multiplex Receiver, and the Frequency Standard generator respectively, followed by numerals identical to the reference numerals used in the corresponding patent applications.

For the most efficient operation, it is necessary for operators at the master station to know the loop time, that is, the time required for any particular signal to travel the entire loop. The operator at the master station, on the basis of the loop delay time figure, requests the operator at the slave station to make certain adjustments so that both stations can have maximum operating time tolerance.

Circuits for determining the loop time at a master station and for locking the diplex transmitter to the diplex receiver at a slave station at an adjustable phase difference are incorporated in the diplex receiving distributor according to the invention. In so far as the determination of total loop time is concerned, it is sufficient to regard the output line DT19 of the channel AB transmitting diplex distributor as being directly electrically connected to the input terminal 11 of the channel AB diplex receiver herein described. It is not even necessary to consider the CD channel apparatus, since this is controlled by the AB channel apparatus. The internal circuitry of the diplex transmitting distributor utilized in the measuring of loop time are so simple as to be readily understood from the following description of the loop time measuring and apportioning circuitry.

At the master station a signal is obtained from the diplex transmitter and applied at the reference pulse input terminal 45 to the grid of an amplifier tube V18A across a grid resistor R130. When that reference pulse signal goes negative, the amplifier tube V18A is cut off and a positive pulse is applied to the grid of a succeeding mixer tube V18B. By means of a multi-position switch SW3 a signal corresponding to one of the timing elements is also applied to the grid of tube V18B. The selector switch SW3 has 16 input leads, one for each timing element, when using 8 unit code. For 7 unit operation, 2 of the leads simply have no signal on them. The switch SW3 is manipulated to select one of the 14 timing pulses applied to the grids of the output gating tubes V26A–V33B, and the selected pulse is applied to an amplifier tube V19A through a series resistor R147. In the diagram only two connections are actually shown in the interest of clarity. Since the timing waves are negative for 13 elements and positive for 1 element, the selected pulse amplifier tube V19A will be blocked for 13 elements. The anode of the tube V19A will be positive for 13 signal elements and negative for 1 signal element. When the tube V19A is blocked, the grid of the mixer tube V18B is just below cutoff due to action of the voltage divider comprising the resistors R140, R141. A positive pulse from the tube V18A will cause the tube V18B to conduct and the neon indicator lamp N2 in the anode circuit of the tube V18B will glow for the duration of the pulse. When the tube V19A conducts, the grid of the tube V18B will be far below the cutoff, and a pulse from the tube V18A cannot cause the tube V18B to conduct, so the neon lamp N2 will remain out. At the master station, the selector switch SW3 is rotated with the attendant flashing of the neon indicator lamp N2, until the neon lamp N2 remains out. The loop time in baudels is indicated directly on an engraved scale by a pointer on the switch.

At the slave station, since there is to be no signal applied to the tube V18A grid, the tubes V18A, V18B and the neon lamp N2 are ignored. The selector switch SW3 in this case is set to select one of the timing elements to be applied to the grid of the tube V19A. The anode of the tube V19A is coupled through a capacitor C50 to the grid of a phase lock output amplifier tube V23A. The tube V23A is normally conducting and passing current through a resistor R174 and a resistor (R19) in the diplex transmitter in the grid circuit of a tube (V1B) performing the same function as the tube V20B of the diplex receiver explained previously, that is, to reset the timing wave generator to a predetermined timing element. The phase difference can be set at any desired number of baudels by rotating the selector switch SW3. The operator at the master station after determining the loop time, informs the operator at the slave station as to what position of the switch SW3 the slave receiver should be set on to apportion the delay time to the best advantage.

The following component part values were used in construction of an electronic diplex receiving distributor as shown in Fig. 2 and described in the foregoing specification for operating speeds of 100 and 85 C. P. S. corresponding to a 50 and 426/7 baud channel speeds respectively. Obviously, other values may be employed for other channel speeds and so forth.

Resistors

| Reference No. | | Value |
|---|---|---|
| R13 | kilohms | 56 |
| R15 | do | 56 |
| R46 | do | 27 |
| R50 | megohms | 1.2 |
| R53 | kilohms | 56 |
| R79 | megohms | 2.7 |
| R85 | do | 2.7 |
| R86 | do | 2.7 |
| R99, 100, 101, 102 | kilohms | 330 |
| R103 | megohms | 2.7 |
| R104 | do | 2 |
| R107 | do | 2.7 |
| R108, 109 | kilohms | 330 |
| R110 | do | 330 |
| R111 | megohms | 2 |
| R118 | kilohms | 10 |
| R125 | do | 220 |
| R128 | megohm | 1 |
| R129 | do | 1.5 |
| R130 | do | 2.7 |
| R131 | kilohms | 75 |
| R137 | do | 47 |
| R140 | do | 910 |
| R141 | megohms | 1.2 |
| R147 | kilohms | 560 |
| R149 | do | 560 |
| R174 | do | 39 |
| R175 | do | 560 |
| R176 | do | 39 |
| R178 | do | 10 |
| R194–R257 | megohms | 4.7 |

Capacitors

| | | |
|---|---|---|
| C6 | microfarads | 0.00047 |
| C24 | do | 0.0002 |
| C33–36 | do | 0.00047 |
| C37 | do | 0.001 |
| C38–40 | do | 0.00047 |
| C43 | do | 0.0002 |
| C50 | do | 0.02 |
| C51 | do | 0.03 |
| C52 | do | 0.00047 |

Tubes

V1A–V33B _____ ½ type 5963

Diodes

D1–D12 _____ 1N34A Germanium

The electronic diplex receiving distributor shown in the schematic diagram of Fig. 2 as actually built, operated from two electronically regulated power supplies. One power supply, having the negative terminal at ground potential, delivered +150 volts to all points marked + or +150 and +75 volts to those points so indicated, with the total drain at approximately 39 milliamperes.

The other power supply having the positive terminal at gound potential, delivered —150 volts at approximately 18 milliamperes at points marked — or —150.

The invention claimed is:

1. An electronic multi-channel receiving distributor system for translating multi-element, fixed length code characters from serial form to separate form including an aggregate signal gating circuit, a signal element regenerator coupled to said gating circuit and comprising a reciproconductive circuit having two stables of equilibrium and complementary output circuits, means to trigger said reciproconductive circuit to one state of equilibrium at channel signal element rate, means to apply pulses to said aggregate signal gating circuit to produce further pulses corresponding to signal elements of one nature to said reciproconductive circuit at channel element rate to trigger said signal element regenerator circuit to the other state of equilibrium, whereby the output circuits of said reciproconductive circuit provide separate output signal trains of opposite polarity directly and indirectly representative of the input signals, at least one signal combining circuit coupled to said signal element regenerator circuit, a plurality of output signal gating circuits having individual terminals coupled to said combining circuit, said signal combining circuit being arranged to connect said output signal gating circuits selectively to the complementary output circuits of said signal element regenerator circuit in response to applied switching potential, a timing wave generator, means to apply harmonically related timing waves from said timing wave generator in predetermined permutations to said output signal gating circuits to condition the same one at a time for conduction, said output signal gating circuits being arranged to conduct on said conditioning only on the application of a regenerated signal element of one nature by said signal element regenerator circuit, a phasing signal comparing circuit, means to apply a given phasing signal as received to said comparing circuit and means to apply pulses obtained from said timing waves in predetermined combinations corresponding to said given phasing signal to produce control pulses when said phasing signal pulses fail to correspond, and means coupled between said comparing circuit and said timing wave generator to alter the phase of the latter in response to each control pulse, and a time period indicating circuit including a mixing circuit, a pulse amplifier circuit arranged to apply a relatively sharp pulse to said time period indicating circuit at a given time with respect to a predetermined one of the timing waves produced by said timing wave generator, means selectively to apply said timing waves to said time period indicating circuit, and an indicator in said time period indicating circuit arranged to indicate the presence of said relatively sharp pulse when the applied timing wave fails to coincide in time with said pulse.

2. In a two-channel receiving diplex distributor for channelizing and elementizing aggregate multi-element fixed length code characters, a signal regenerator circuit including a bistable reciproconductive circuit comprising a pair of cross-connected electron discharge structures having cathode, grid and anode electrodes, a capacitor and a diode element connected as a differentiating network in the cathode circuit of one of said structures, means to apply narrow pulses of energy to said differentiating network at signal element rate to trigger said reciproconductive circuit to the condition of equilibrium wherein said one electron discharge structure is conducting and the other structure is blocked, a signal gating tube comprising a cathode to which the received aggregate code signals are applied, an anode connected to the anode electrode of said other structure and a control grid, means to apply pulses wider than said narrow pulses and corresponding to input signal elements of one nature to the control grid of said signal gating tube to trigger said bistable reciproconductive circuit to the other condition of equilibrium, whereby potentials at the individual anode electrodes of said electron discharge structures form separate output signal trains directly and indirectly representative of the input signal train, two signal combining circuits coupled to said signal regenerator circuit, two banks of output signal gating circuits, each bank comprising a plurality of electron discharge devices having common cathode electrodes and grid and anode electrodes, output terminals coupled to said anode electrodes of said output signal gating circuits, said signal combining circuits each including a pair of triode tubes having common anode connections coupled to said common cathode electrodes of one of said banks of output signal gating circuits, common cathode connections and cross-connections individual to the grid and anode electrodes of said cross-connected electron discharge structures, each signal combining circuit having a switching circuit coupled thereto comprising cascade-connected electron discharge systems having the anodes thereof individually connected to the grids of said combining tubes, means to apply potential to said switching circuits selectively to couple the anode electrodes of said electron discharge structures to said common cathode electrodes of said banks of output signal gating circuits, means to apply harmonically related timing waves in predetermined permutations to the grids of said output signal gating circuits to render said output signal gating circuits to an operating point just below conduction one at a time in succession to produce pulses at said output terminals corresponding to input signal elements of one nature.

3. A multi-channel receiving distributor system for translating aggregate multiplex multi-element fixed length code characters from serial form to separate form and for selecting the signal elements corresponding to one channel to the exclusion of the signal elements of the following channel including an aggregate signal gating circuit, a signal element regenerator comprising a bistable reciproconductive circuit coupled to said gating circuit and having complementary output circuits, means to trigger said reciproconductive circuit to one state of equilibrium at half aggregate signal element rate, means to apply said aggregate multiplex signal to said gating circuit, means to apply pulses to said gating circuit at half aggregate signal element rate to produce further pulses corresponding to signal elements of one nature of one channel to said reciproconductive circuit to trigger said circuit to the other state of equilibrium, whereby the complementary output circuits of said reciproconductive circuit provide separate output signal trains of opposite polarity directly and indirectly representative of the input signals.

4. In a multiplex telegraph system, of the type wherein time division aggregate multiplex mark-space signal is transmitted, an electronic circuit arrangement for channelizing and elementizing said signal including a controlled electron path device having an emitter electrode, a control electrode and an output electrode, a bistable reciproconductive circuit comprising a pair of controlled electron path structures having emitter electrodes, and cross-coupled control and output electrodes, the output electrode of said controlled electron path device being connected to said bistable reciproconductive circuit, means to apply negative pulses at a multiple including unity of the signal element rate to said reciproconductive circuit to trigger the same to a predetermined state of conduction, means to apply said mark-space signal to one electrode of said controlled electron path device to render the same just below a state of conduction on application of signal elements of one nature, means to apply positive pulses at a multiple including unity of the signal element rate to said controlled electron path device to render the same conducting on application of signal elements of said one nature to the one electrode thereby to trigger said reciproconductive circuit to the reciprocal condition of conduction, a plurality of controlled electron path systems having emitter electrodes connected in common, input electrodes and output electrodes connected to individual output terminals, means to apply said regenerated signal elements to said emitter electrodes, and means coupled to the input electrodes to render said systems conducting in succession on application of regenerated signal elements of one nature.

5. In a multiplex telegraph system, of the type wherein time division aggregate multiplex mark-space signal is transmitted, an electronic circuit arrangement for channelizing and elementizing said signal including an electron discharge device having a cathode electrode, a control electrode and an anode electrode, a bistable reciproconductive circuit comprising a pair of electron discharge structures having cathodes, and cross-coupled grids and anodes, the anode electrode of said electron discharge device being connected to said bistable reciproconductive circuit, means to apply negative pulses at a multiple including unity of signal element rate to said reciproconductive circuit to trigger the same to a predetermined state of conduction, means to apply said mark-space signal to the cathode electrode of said electron discharge device to render the same just below a state of conduction on application of signal elements of one nature, means to apply positive pulses at a multiple including unity of the signal element rate to said electron discharge device, to render the same conducting on application of signal elements of said one nature to the cathode electrode thereby to trigger said reciproconductive circuit to the reciprocal condition of conduction, the negative pulses being of shorter duration than said positive pulses, thereby insuring positive control of said reciproconductive circuit by said mark-space signal, a plurality of electron discharge system having cathode electrodes connected in common, grid electrodes and anode electrodes connected to individual output terminals, means to apply said regenerated signal elements to said cathode electrodes, and means coupled to grid electrodes to render said systems conducting in succession on application of regenerated signal elements of one nature.

6. In a multiplex telegraph system, of the type wherein time division aggregate multiplex mark-space signal is transmitted, an electronic circuit arrangement for channelizing and elementizing said signal including an electron discharge device having a cathode electrode, a control electrode and an anode electrode, a bistable reciproconductive circuit comprising a pair of electron discharge structures having cathodes, and cross-coupled grids and anodes, the anode electrode of said electron discharge device being connected to said bistable reciproconductive circuit, means to apply negative pulses at twice the signal element rate to said reciproconductive circuit to trigger the same to a predetermined state of conduction, means to apply said mark-space signal to the cathode electrode of said electron discharge device to render the same just below a state of conduction on application of signal elements of one nature, means to apply positive pulses at twice the signal element rate to said electron discharge device, to render the same conducting on application of signal elements of said one nature to the cathode electrode thereby to trigger said reciproconductive circuit to the reciprocal condition of conduction, the negative pulses being of shorter duration than said positive pulses thereby insuring positive control of said reciproconductive circuit by said mark-space signal, a plurality of electron discharge systems having cathode electrodes connected in common, grid electrodes and anode electrodes connected to individual output terminals, means to apply said regenerated signal elements to said cathode electrodes, and means coupled to the grid electrodes to render said systems conducting in succession on application of regenerated signal elements of one nature.

7. In a telegraph system having an input circuit to which an incoming mark-space signal of given polarity is applied and a signal regenerator circuit coupled to said input circuit to produce one output signal of said given polarity and another output signal of polarity opposite to said given polarity, a circuit arrangement for automatically selecting the desired polarity of output signal including a pair of controlled electron path systems, each of said systems having emitter electrodes connected in common and output electrodes connected in common to a common output terminal and a first control electrode, said first control electrode of one of said controlled electron path systems having said output signal of given polarity applied thereto and said first control electrode of the other of said controlled electron path systems having said output signal of opposite polarity applied thereto, means to apply a negative bias potential to said first control electrode of one of said controlled electron path systems and a positive bias potential to said first control electrode of the other of said systems whereby the one of said systems having only positive potentials on the first control electrode thereof will be conducting, said means comprising a pair of controlled electron path devices directly connected in cascade, the output of one of said devices being connected to said first control electrode of said one system and the output of the other device being connected to said first control electrode of the other system, and means to apply a potential to the input of the first of said devices to reverse the conditions of conduction of said controlled electron path devices thereby to reverse the polarity of the output signal at the common output terminals.

8. In a telegraph system having an input circuit to which an incoming mark-space signal of given polarity is applied and a signal regenerator circuit coupled to said input circuit to produce one output signal of said given polarity and another output signal of polarity opposite to said given polarity, a circuit arrangement for automatically selecting the desired polarity of output signal including a pair of electron discharge systems, each of said systems having cathode electrodes connected in common and anode electrodes connected in common to a common output terminal and a first grid electrode, said first grid electrode of one of said discharge systems having said output signal of given polarity applied thereto and said first grid electrode of the other of said discharge systems having said output signal of opposite polarity applied thereto, means to apply a negative bias potential to said first grid of one of said discharge systems and a positive bias potential to said first grid of the other of said discharge systems whereby the one of said discharge systems having only positive potentials on the first grid electrode thereof will be conducting, said means comprising a pair of electron discharge devices directly connected in cascade, the output of one of said discharge devices being connected to said first grid electrode of said one discharge system and the output of the other discharge device being connected to said first grid electrode of the other discharge system and means to apply a potential to the input of the first of said discharge devices to reverse the conditions of conduction of said electron discharge devices thereby to reverse the polarity of the output signal at the common output terminals.

9. In a telegraph communications system of the type including a multi-channel transmitting distributor coupled to a receiving diplex distributor, means for phasing said receiving diplex distributor with the transmitting diplex distributor and means at said transmitting distributor repetitiously to transmit a given character on one channel, the improvement comprising means at said receiving diplex distributor to receive said given character as transmitted, means to generate a series of pulses in synchronization with said received character, means to distribute said pulses in accordance with the sequence of elements of said given character, means to compare the elements of said given character as received with said pulses as distributed, and means under control of said comparing means to alter the phase of the generation and distribution of said pulses with respect to the elements of said received character by one element for every instance in which the distributed pulse and the element compared therewith are not in accord.

10. In a telegraph communications system of the type including a transmitting diplex distributor coupled to a receiving diplex distributor, means for phasing said receiving diplex distributor with the transmitting diplex distributor and means at said transmitting distributor repetitiously to transmit a given character on one channel, the improvement comprising means at said receiving diplex distributor to receive said given character as transmitted, means to generate a series of pulses in synchronization with said received character, means to distribute said pulses in accordance with the nature of the elements of said given character, means to compare the elements of said given character as received with the pulses corresponding to the elements as distributed, and means under control of said comparing means to alter the phase of the generation and distribution of said pulses with respect to the elements of said received character by one element for every instance in which the distributed pulse and the element compared therewith fail to correspond.

11. In a telegraph communication system of the type including an electronic transmitting distributor having a plurality of successively actuatable controlled electron path devices divided into a number of groups corresponding to a number of communication channels provided by the system and under the control of an electronic commutator device, and an electronic receiving distributor having the same plurality of successively actuatable controlled electron path devices under control of another electronic commutator device synchronized but not phased with the first said electronic commutator device, a circuit arrangement to couple said electronic transmitting and receiving distributors together in the proper phase relationship, said circuit arrangement comprising means at said transmitting distributor to repetitiously actuate said controlled electron path device corresponding to a given channel to transmit a predetermined code character, a pair of controlled electron path devices at the receiving distributor, means to apply the received signals to said pair of controlled electron path devices in phase opposition, said pair of controlled electron path devices being coupled to the plurality of successively actuatable controlled electron path devices at the receiver corresponding to that plurality at the transmitter for transmitting said predetermined signal, means in said coupling to present pulses to said pair of controlled electron path devices in accordance with the nature of the individual signal elements of said predetermined character whereby neither of said pair of controlled electron path devices will respond when the applied pulses and received signal elements are in agreement, and one of said pair of controlled electron path devices will respond where there is no agreement, and means coupled to said pair of controlled electron path devices to alter the phase relationship of said other electronic commutator device in the absence of said agreement.

12. In a telegraph communications system of the type including an electronic transmitting distributor having a plurality of successively actuatable electron discharge devices divided into a number of groups corresponding to a number of communication channels provided by the system and under the control of an electronic commutator device, and an electronic receiving distributor having the same plurality of successively actuatable electron discharge devices under the control of another electronic commutator device synchronized but not phased with the first said electronic commutator device, a circuit arrangement interconnecting said electronic transmitting and receiving distributors in the proper phase relationship, said circuit arrangement comprising means at said transmitting distributor to repetitiously actuate said electron discharge devices corresponding to a given channel only to transmit a predetermined code character, a pair of electron discharge devices at the receiving distributor, means to apply the received signals to said pair of electron discharge devices being coupled to the plurality of successively actuatable electron discharge devices at the receiver corresponding to that plurality at the transmitter for transmitting said predetermined signal, means in said coupling to present pulses to said pair of electron discharge devices in accordance with the nature of the individual signal elements of said predetermined character whereby neither of said pair of electron discharge devices will conduct when the applied pulses and received signal elements are in agreement, and one of said pair of electron discharge devices will conduct where there is no agreement, and means coupled to said pair of electron discharge devices to alter the phase relationship of said other electronic commutator device in the absence of said agreement.

13. In a telegraph communications system of the type including an electronic transmitting distributor having a plurality of successively actuatable electron discharge devices divided into a number of groups corresponding to a number of communication channels provided by the system and under the control of an electronic commutator device, and an electronic receiving distributor having the same plurality of successively actuatable electron discharge devices under the control of another electronic commutator device synchronized but not phased with the first said electronic commutator device, a circuit arrangement interconnecting said electronic transmitting and receiving distributors in the proper phase relationship, said circuit arrangement comprising means at said transmitting distributor to repetitiously actuate said electron discharge devices corresponding to a given channel only to transmit a predetermined code character, a pair of electron discharge devices at the receiving distributor, means to apply the received signals to said pair of electron discharge devices in phase opposition, said pair of electron discharge devices being coupled to the plurality of successively actuatable electron discharge devices at the receiver corresponding to that plurality at the transmitter for transmitting said predetermined signal, means in said coupling to present pulses to said pair of electron discharge devices in accordance with the nature of the individual signal elements of said predetermined character whereby neither of said pair of electron discharge devices will respond when the applied pulses and received signal elements are in agreement, and one of said pair of electron discharge devices will respond where there is no agreement, and means coupled to said pair of electron discharge devices to alter the phase relationship of said other electronic commutator device by one signal element step in the absence of said agreement.

14. In a telegraph communications system of the type including apparatus for transmitting and receiving at least one channel of telegraph signals in one direction and further apparatus for transmitting and receiving at least one other channel of telegraph signals in the opposite direction and having interconnections between the receiving apparatus and the transmitting apparatus at each terminal to alter transmission in one channel upon detection of a given condition in the other channel, there being a generator of timing waves in each component of said transmitting and receiving apparatus in each channel being synchronized, a circuit arrangement in the receiving apparatus for measuring the delay time around the complete loop, said circuit arrangement comprising a first controlled electron path device having an input circuit and an output circuit, selector means to couple said input circuit to the generator of timing waves for the receiver under consideration to apply one of the timing waves generated therein to said controlled electron path device to produce a pulse in said output circuit spaced in time according to the time of occurrence of the timing wave selected, means to apply said output pulse to the timing wave generator of the transmitting apparatus located at the terminal under consideration, a second controlled electron path device having an input circuit, an indicating device coupled to the output circuit of said second controlled electron path device to indicate the presence or absence of electron flow therein, means to couple the input circuit of said second controlled electron path device to the output circuit of said first controlled electron path device to apply said output pulse to said second controlled electron path device, means to bias said second controlled electron path device normally to prevent electron flow therein, means to apply a pulse of polarity opposite to that of the first said pulse to the input circuit of said second controlled electron flow device, as compared to the value of bias the amplitudes of said pulses being of values at which electron flow is present in said second controlled electron flow device in the presence of second said pulse at all times except in the presence of the first said pulse.

15. In a telegraph communications system of the type including apparatus for transmitting and receiving at least one channel of telegraph signals in one direction and further apparatus for transmitting and receiving at least one other channel of telegraph signals in the opposite direction and having interconnections between the receiving apparatus and the transmitting apparatus at each terminal to alter transmission in one channel upon detection of a given condition in the other channel, there being a generator of timing waves in each component of said transmitting and receiving apparatus and said transmitting and receiving apparatus in each channel being synchronized, a circuit arrangement in the receiving apparatus for measuring and distributing the delay time around the complete loop, said circuit arrangement comprising a first electron discharge device having an input circuit and an output circuit, selector means to couple said input circuit to the generator of timing waves for the receiver under consideration to apply one of the timing waves generated therein to said electron discharge device to produce a negative going pulse in said output circuit in time according to the time of occurrence of the timing wave selected, means to apply said negative going output pulse to the timing wave generator of the transmitting apparatus located at the terminal under consideration, a second electron discharge device having an input circuit and an output circuit, an indicating device coupled to the output circuit of said second electron discharge device to indicate the presence or absence of electron current therein, means to couple the input circuit of said second electron discharge device to the output circuit of said first electron discharge device to apply said negative going pulse to said second electron discharge device, means to bias said second electron discharge device normally to prevent electron flow therein, means to apply a positive going pulse to apply a positive going pulse to the input circuit of said second electron discharge device, and means to differentiate said positive going pulse to render the same narrower than said negative going pulse, as compared to the value of bias, the amplitudes of said pulses being of values at which electron flow is present in said second electron discharge device in the presence of said narrowed positive going pulse at all times except in the presence of said negative going pulse.

16. In a telegraph communications system of the type including apparatus for transmitting and receiving at least one channel of telegraph signals in one direction and further apparatus for transmitting and receiving at least one other channel of telegraph signals in the opposite direction and having interconnections between the receiving apparatus and the transmitting apparatus at each terminal to alter transmission in one channel upon detection of a given condition in the other channel, there being a generator of timing waves in each component of said transmitting and receiving apparatus and said transmitting and receiving apparatus in each channel being synchronized, a circuit arrangement in the receiving apparatus for measuring and distributing the delay time around the complete loop, said circuit arrangement comprising a vacuum tube structure having a cathode, a grid and an anode, a multi-position selector switch arranged to couple the grid of said structure to the generator of timing waves for the receiver under consideration to apply one of the timing waves generated therein to the grid of said vacuum tube structure to produce a negative going pulse at the anode of said structure spaced in time according to the time of occurrence.

17. In a multiplex telegraph signal receiving system, means to generate a plurality of harmonically related timing waves, a plurality of output signal gating tubes each having cathode, grid and anode electrodes, means to apply operating potentials to said signal gating tubes to maintain the same normally well below cutoff condition, means to apply said timing waves to the grid electrodes of said signal gating tubes to said the condition of conduction of but one of said tubes to substantially cut off in succession, output pulse differentiating elements individually connected to the anode electrodes of said signal gating tubes, and means to apply signal elements of a given code character to the cathode electrodes of said signal elements at individual output elements consecutively in time.

18. In a receiving diplex distributor a signal regenerator circuit including a bistable reciproconductive circuit comprising a pair of cross-connected electron discharge structures having cathode, grid and anode electrodes, a means to apply pulses of energy in the cathode circuit of one of said structures at signal element rate to trigger said reciproconductive circuit to a condition of equilibrium wherein said one electron discharge structure is conducting and the other structure is blocked, a signal control tube comprising a cathode, an anode connected to the anode electrode of said other structure, and a control grid, means to apply received signal to said cathode, means to apply pulses at half signal element rate and wider than the first said pulses and corresponding to input signal elements of one nature to the control grid of said signal control tube to trigger said bistable reciproconductive circuit to the other condition of equilibrium upon application of received signal elements of said one nature to the cathode of said signal control tube, whereby potentials at the individual anode electrodes of said electron discharge structures form separate output signal trains directly and indirectly representative of the alternate elements of said input signal train, an electronic signal combining circuit coupled to said signal regenerator circuit, said signal combining circuit including a pair of electron discharge tubes having common anode connections, common cathode connections and grid connections individual to the anode electrodes of said cross-connected electron discharge structures, a plurality of output signal gating tubes having common cathode connections, individual grids and separate anodes, a pair of electron discharge switching systems connected in cascade and having the anodes thereof individually connected to the grids of said signal combining tubes to bias said combining tubes selectively to couple the anode electrodes of said electron discharge structures to cathodes of said output signal gating tubes, means to apply a direct potential in the input circuit of the first of said cascaded electron discharge systems to actuate said switching circuit, individual anode impedance elements connected to the anodes of said output signal gating tubes, means to apply harmonically related timing waves in predetermined permutations to the grids of said output signal gating tubes to pulse said gating tubes to an operating point just below conduction successively, thereby to present every other one of said received signal elements sequentially in time at the anodes of separate output signal gating tubes.

References Cited in the file of this patent

UNITED STATES PATENTS

| | | |
|---|---|---|
| 2,365,450 | Bliss | Dec. 19, 1944 |
| 2,520,953 | Norris et al. | Sept. 5, 1950 |
| 2,609,452 | Hansen | Sept. 2, 1952 |

FOREIGN PATENTS

| | | |
|---|---|---|
| 221,341 | Germany | Apr. 28, 1910 |